US008942905B2

(12) United States Patent
Doi et al.

(10) Patent No.: US 8,942,905 B2
(45) Date of Patent: Jan. 27, 2015

(54) SAFEGUARD SYSTEM FOR VEHICLE

(75) Inventors: Masakazu Doi, Obu (JP); Mitsuhiro Tokimasa, Okazaki (JP); Takumi Nagaya, Kariya (JP)

(73) Assignee: Denso Corporation, Kariya (JP)

( * ) Notice: Subject to any disclaimer, the term of this patent is extended or adjusted under 35 U.S.C. 154(b) by 87 days.

(21) Appl. No.: 13/569,447

(22) Filed: Aug. 8, 2012

(65) Prior Publication Data
US 2013/0041564 A1 Feb. 14, 2013

(30) Foreign Application Priority Data

Aug. 10, 2011 (JP) ................. 2011-175026

(51) Int. Cl.
*B60T 7/12* (2006.01)
*G06F 17/00* (2006.01)
*B60T 7/22* (2006.01)
*B60W 10/06* (2006.01)
*B60W 30/095* (2012.01)

(52) U.S. Cl.
CPC ............... *B60T 7/22* (2013.01); *B60W 52/087* (2013.01); *B60T 2201/022* (2013.01); *B60W 10/06* (2013.01); *B60W 30/095* (2013.01); *B60W 2540/10* (2013.01); *B60W 2540/106* (2013.01); *B60W 2550/10* (2013.01)
USPC .............................................. 701/70; 701/46

(58) Field of Classification Search
CPC .............................. B60T 2201/22; B60T 7/22
USPC ...................................................... 701/70, 46
See application file for complete search history.

(56) References Cited

U.S. PATENT DOCUMENTS

| 2003/0135317 A1* | 7/2003 | Hijikata et al. ................. 701/70 |
| 2006/0097570 A1* | 5/2006 | Doerr et al. .................... 303/193 |
| 2010/0023226 A1* | 1/2010 | Ito .................................. 701/46 |
| 2010/0250085 A1* | 9/2010 | Sugano et al. ................. 701/70 |

FOREIGN PATENT DOCUMENTS

| JP | 01-121524 | 5/1989 |
| JP | 05-256170 | 10/1993 |
| JP | 05256170 A * | 10/1993 |
| JP | 6-299880 | 10/1994 |
| JP | 06299880 A * | 10/1994 |
| JP | 2000-291458 | 10/2000 |
| JP | 2005-143896 | 6/2005 |
| JP | 2005143896 A * | 6/2005 |

OTHER PUBLICATIONS

Office Action issued Jul. 16, 2013 in corresponding JP Application No. 2011-175026 (with English translation).

* cited by examiner

*Primary Examiner* — Fadey Jabr
*Assistant Examiner* — Yazan A Soofi
(74) *Attorney, Agent, or Firm* — Harness, Dickey & Pierce, PLC

(57) ABSTRACT

A safeguard system for a vehicle is provided which works as an unintended operation control system. The safeguard system works to calculate an accelerator-manipulated variable representing a degree to which an accelerator of the vehicle is manipulated. When it is found that the accelerator-manipulated variable has dropped at a given rate and then risen within a preselected rise time period, the safeguard system determines that such an operation is an unintended action and controls an operation of the vehicle such as acceleration or speed of the vehicle to minimize the probability of encountering a hazard to the vehicle.

12 Claims, 13 Drawing Sheets

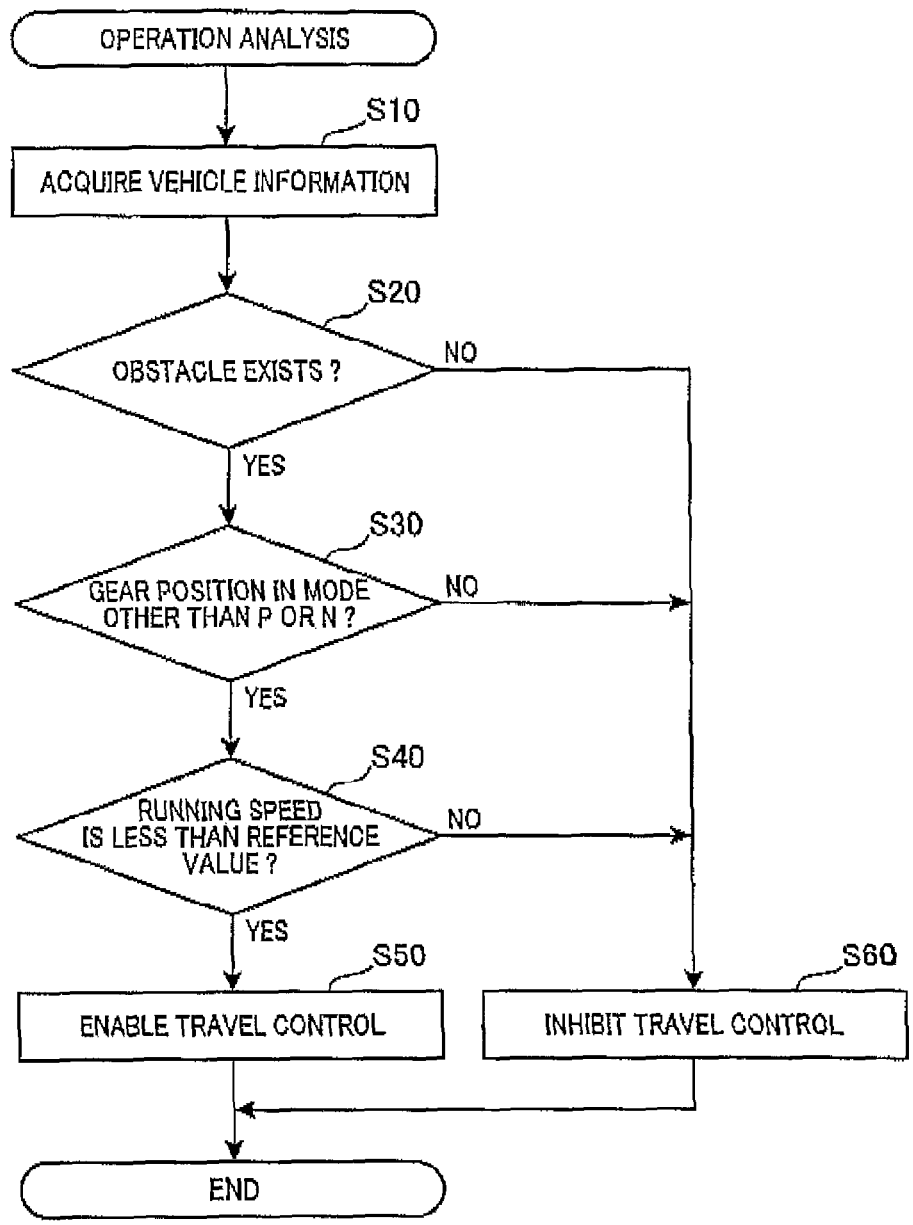

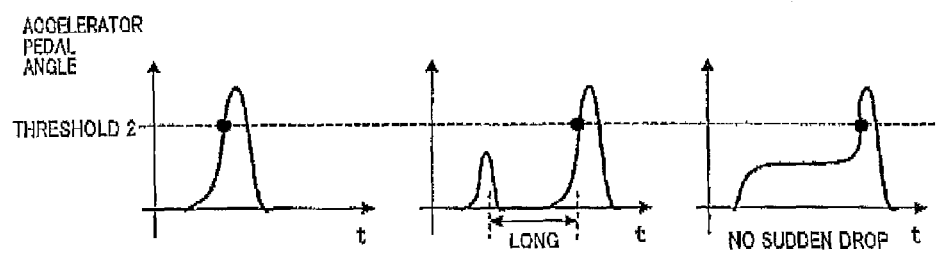
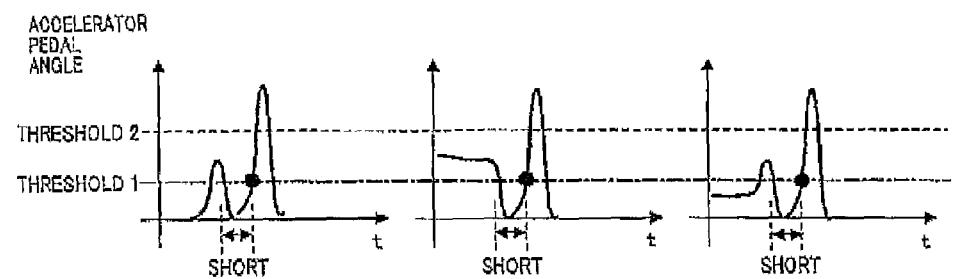

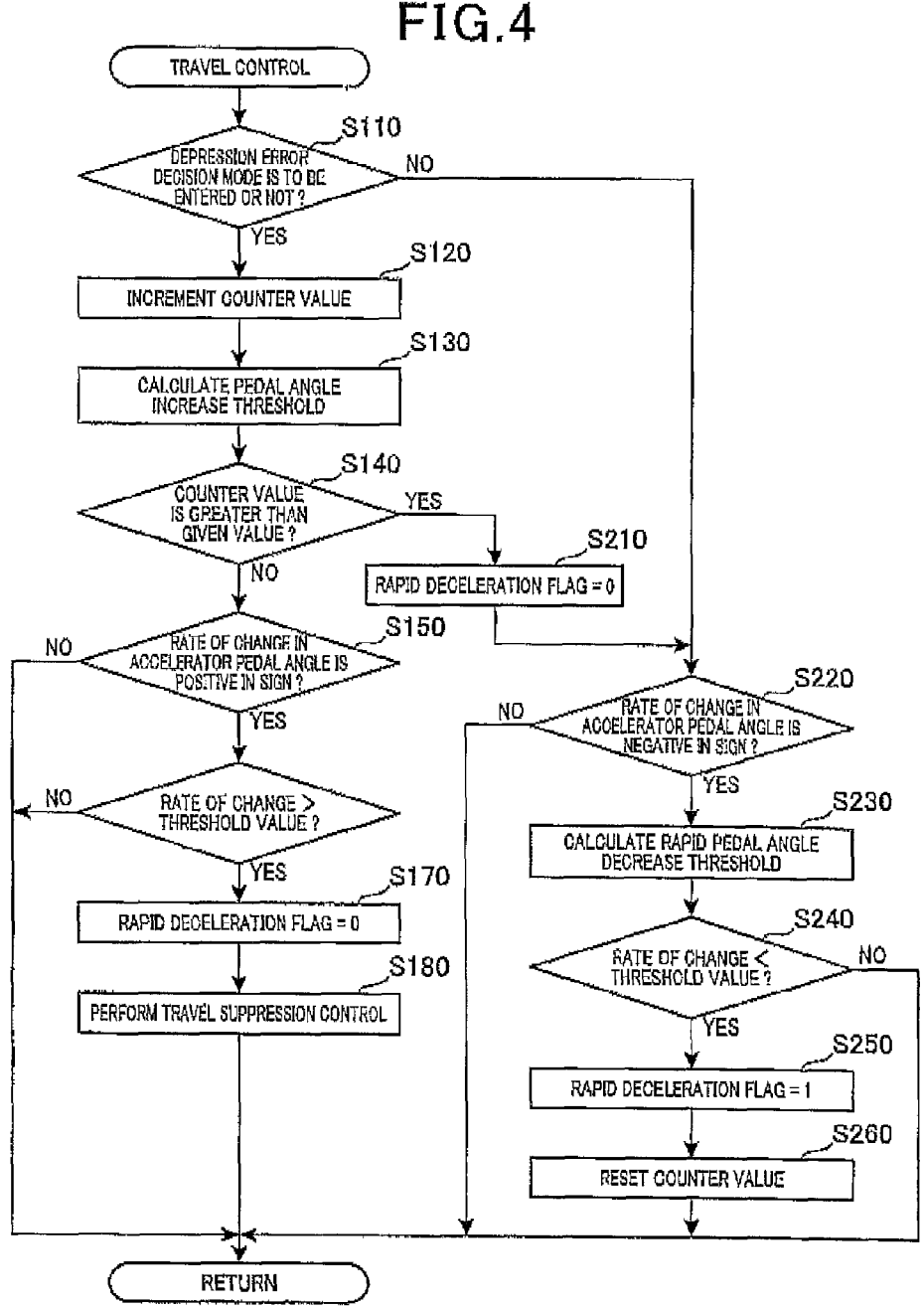

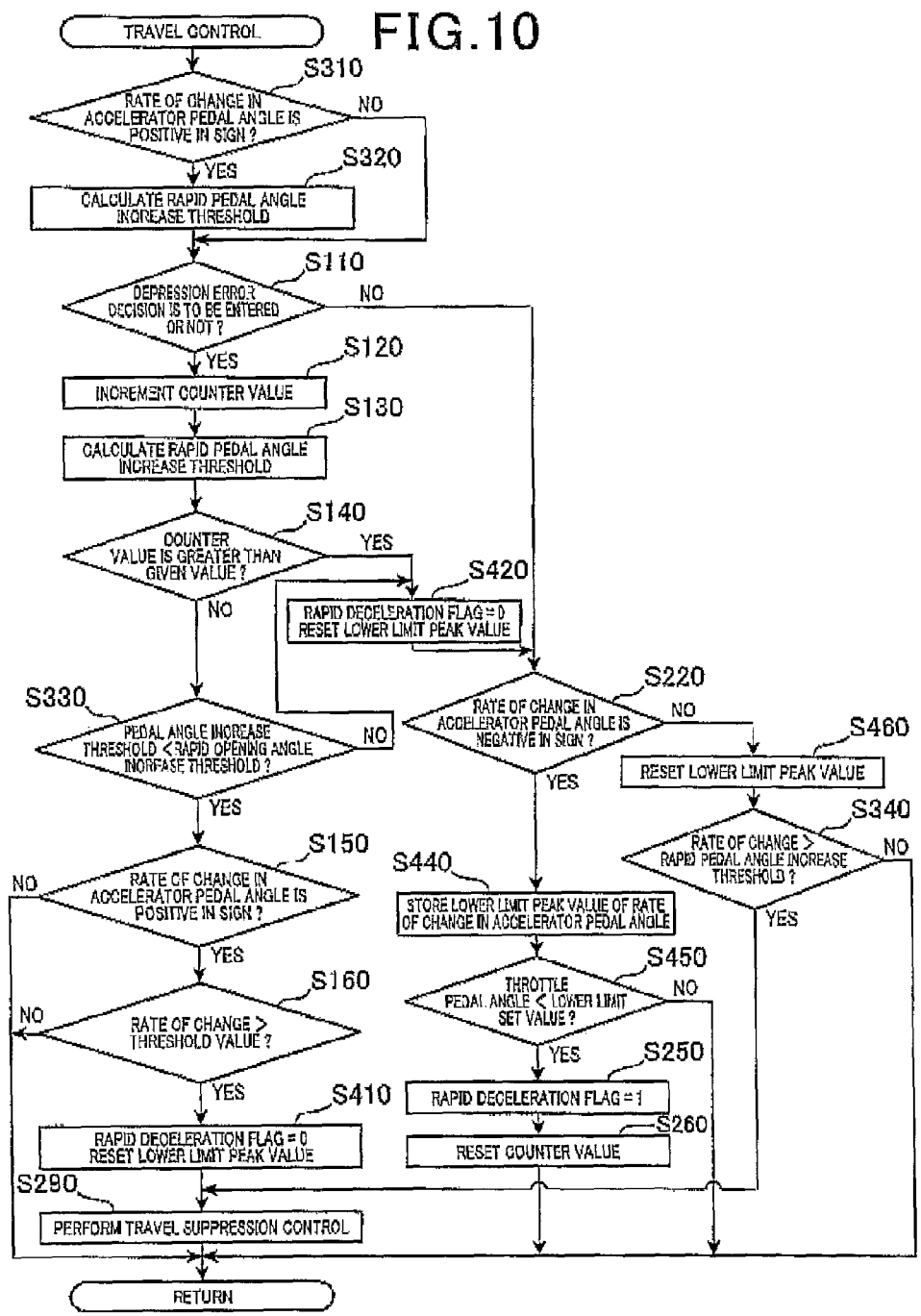

SAFEGUARD SYSTEM FOR VEHICLE

CROSS REFERENCE TO RELATED DOCUMENT

The present application claims the benefit of priority of Japanese Patent Application No. 2011-175026 filed on Aug. 10, 2011, the disclosure of which is incorporated herein by reference.

BACKGROUND OF THE INVENTION

1 Technical Field

This disclosure relates generally to a safeguard system for a vehicle which is designed to minimize the probability of encountering a hazard to which the vehicle would be subjected due to an unintended operation on the vehicle.

2 Background Art

Japanese patent First Publication No. 6-299880 discloses an operation control system for internal combustion engines which is engineered to monitor whether an open position of an accelerator pedal of an automotive vehicle has exceeded a threshold value or not and, when such a condition is encountered, determine that a vehicle operator has depressed the accelerator pedal in error instead of a brake pedal to produce unintended acceleration.

The operation control system is, however, required to set the threshold value to a greater value in order to enable intended acceleration of the vehicle, which may cause the speed of the vehicle to increase undesirably until the acceleration of the vehicle starts to be controlled.

SUMMARY

It is therefore an object to provide a safeguard system which is engineered to control an unintended operation of a vehicle before the speed of the vehicle becomes undesirably high, for example, when a vehicle operator has activated an accelerator in error instead of a brake.

According to one aspect of an embodiment, there is provided a safeguard system for a vehicle such as an automobile. The safeguard system comprises: (a) an accelerator-manipulated variable calculator which calculates an accelerator-manipulated variable representing a degree to which an accelerator of the vehicle is manipulated; and (b) a hazard-minimizing controller which works to control an operation of the vehicle so as to minimize the probability of encountering a hazard to the vehicle when it is found that the accelerator-manipulated variable, as calculated by the accelerator-manipulated variable calculator, has dropped at a given rate and then risen within a preselected rise time period.

Usually, when unintentionally pressing a accelerator pedal of the vehicle in error instead of a brake pedal, a human operator or driver of the vehicle tends to step on the accelerator pedal twice successively within a short period of time, while when pressing the accelerator pedal deliberately, the driver rarely depresses the accelerator pedal twice in quick succession. Therefore, when the driver has manipulated the accelerator twice within the given short period of time, the hazard-minimizing controller determines that an error has occurred in activating the accelerator and controls the operation of the vehicle to minimize the probability of encountering the hazard to the vehicle. For example, when the accelerator-manipulated variable has dropped by a drop threshold or more within a preselected drop time period, that is, the accelerator-manipulated variable has decreased greatly or at a great rate, after which the accelerator-manipulated variable has increased, the hazard-minimizing controller may decide that an error has occurred in activating the accelerator.

As apparent from the above discussion, at the time when it is found that the accelerator-manipulated variable has increased after having decreased, the safeguard system immediately starts to control the operation of the vehicle, thus eliminating the probability of the hazard before the speed of the vehicle rises undesirably.

In the preferred mode of the embodiment, when the accelerator-manipulated variable has dropped by the drop threshold or more within the preselected drop time period and then exceeded a rise threshold within the rise time period, the hazard-minimizing controller works to minimize the probability of encountering the hazard to the vehicle. In other words, when the accelerator-manipulated variable has increased slightly, but it is less than the rise threshold, the hazard-minimizing controller may decide that no error has occurred in activating the accelerator accidently, thereby avoiding an error in controlling the operation of the vehicle. The rise threshold may be determined regardless of typical accelerating action and thus set to a value smaller than that used in prior art systems.

The hazard-minimizing controller may increase the rise threshold with an increase in time elapsed since the accelerator-manipulated variable has dropped by the drop threshold or more within the preselected drop time period.

Specifically, when the driver activates the accelerator unintentionally, the accelerator-manipulated variable tends to increase immediately after having dropped. The probability that the driver has not activated the accelerator accidently, therefore, becomes higher with an increase in time elapsed since the accelerator-manipulated variable has decreased. The hazard-minimizing controller may, thus, increase the rise threshold with an increase in time elapsed since the accelerator-manipulated variable has dropped, thereby minimizing an error in controlling the operation of the vehicle to minimize the probability of encountering the hazard. Such determination of the rise threshold is preferably made cyclically.

The hazard-minimizing controller may decrease the drop threshold with an increase in rate at which the accelerator-manipulated variable has dropped by the drop threshold or more. In other words, the safeguard system works to monitor a degree of impatience (i.e., the state of mind) of the driver in terms of the rate of drop of the accelerator-manipulated variable and accelerate the execution of control of the operation of the vehicle as the degree of impatience increases, that is, the rate of drop of the accelerator-manipulated variable becomes high.

The hazard-minimizing controller may decrease the rise threshold with an increase in value of the accelerator-manipulated variable at a time when the accelerator-manipulated variable starts to drop. This is for the following reasons. Usually, a driver's quick motion to deactivate the accelerator after the accelerator is actuated greatly is thought of as being a highly urgent operation of the driver. A subsequent slight motion to activate the accelerator may, thus, be determined as being high in probability of an error in activating the accelerator. The determination of the rise threshold in the above manner, thus, enables the operation of the vehicle to be controlled to minimize the probability of encountering the hazard quickly when the probability of error in activating the accelerator is high.

The hazard-minimizing controller may decrease the rise threshold with a decrease in minimum value of a rate of change in the accelerator-manipulated variable when the accelerator-manipulated variable has dropped. This also enables the operation of the vehicle to be controlled to minimize the probability of encountering the hazard quickly when the probability of error in activating the accelerator is high.

The hazard-minimizing controller may decrease the drop threshold (i.e., an amount of decrease used in determining that the accelerator-manipulated variable has decreased) with a decrease in value of the accelerator-manipulated variable at a time when the accelerator-manipulated variable starts to drop. This enables the fact that the accelerator-manipulated variable has dropped to be found correctly even when the accelerator-manipulated variable is small and also minimizes the probability of error in detecting a drop in the accelerator-manipulated variable.

When the accelerator-manipulated variable has increased to be greater than a given acceleration threshold value, the hazard-minimizing controller may decide that the driver has activated the accelerator accidently and control the operation of the vehicle so as to minimize the probability of encountering the hazard to the vehicle. This enables the driver's error in activating the accelerator to be eliminated even when the fact that the accelerator-manipulated variable has dropped is not found.

The rise threshold may be selected to be smaller than the acceleration threshold value. This achieves a quick detection of the driver's error in activating the accelerator after the accelerator-manipulated variable has dropped.

The safeguard system may also include an obstacle detector which detects an obstacle in a direction in which the vehicle is traveling. The hazard-minimizing controller controls the operation of the vehicle so as to minimize the probability of encountering the hazard to the vehicle only when the obstacle has detected by the obstacle detector. This permits the operation of the vehicle to be controlled to minimize the probability of encountering the hazard when there is no obstacle in front of the vehicle.

The hazard-minimizing controller may determine whether the vehicle is in a travel-enabled condition where the vehicle is enabled to run or not. When the vehicle is determined not to be in the travel-enabled condition, the hazard-minimizing controller is inhibited from controlling the operation of the vehicle so as to minimize the probability of encountering the hazard to the vehicle. This avoids undesired control action to minimize the probability of encountering the hazard to the vehicle.

The hazard-minimizing controller may determine whether a speed of the vehicle is greater than or equal to a reference value or not. When the speed of the vehicle is determined to be greater than the reference value, the hazard-minimizing controller is inhibited from controlling the operation of the vehicle so as to minimize the probability of encountering the hazard to the vehicle. Usually, when the vehicle is running at a relatively high speed, there is a low probability that the driver activates the accelerator accidently. When such a probability is met, the hazard-minimizing controller does not control the operation of the vehicle to minimize the probability of encountering the hazard.

The hazard-minimizing controller may be engineered to suppress the acceleration of the vehicle to minimize the probability of encountering the hazard to the vehicle.

The hazard-minimizing controller may alternatively be engineered to suppress the speed of the vehicle to minimize the probability of encountering the hazard to the vehicle.

The hazard-minimizing controller may also raise an alarm to urge a driver of the vehicle to minimize the probability of encountering the hazard to the vehicle.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1(b) is a flowchart of an operation analyzing program to be executed by the unintended operation control system of FIG. 1(a);

FIGS. 2(a), 2(b), and 2(c) are graphs each of which demonstrates a time-series change in position of an accelerator pedal in an acceleration control mode when a driver depresses the accelerator pedal one time in a short period of time;

FIGS. 3(a), 3(b), and 3(c) are graphs each of which demonstrates a time-series change in position of an accelerator pedal in an acceleration control mode when a driver depresses the accelerator pedal several times in a short period of time;

FIG. 4 is a flowchart of a travel control task to be executed by the unintended operation control system of FIG. 1(a);

FIG. 10 is a flowchart of a travel control task to be executed by an unintended operation control system of the third embodiment;

DESCRIPTION OF THE PREFERRED EMBODIMENTS

Figure 1A:
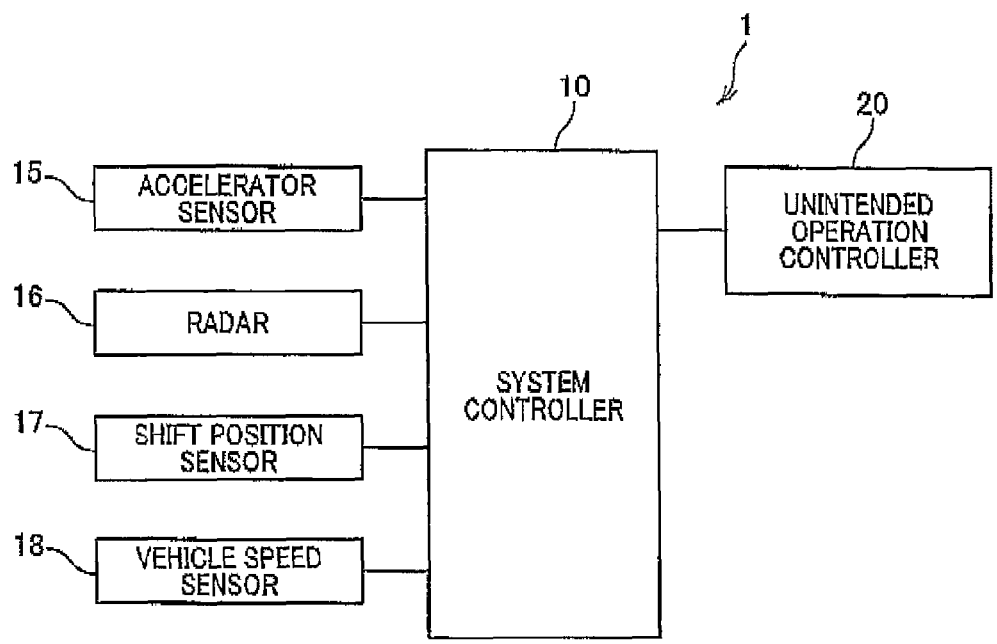
FIG. 1(a) is a block diagram which illustrates an unintended operation control system according to the first embodiment.

Referring to the drawings, wherein like reference numbers refer to like parts in several views, particularly to FIG. 1(a), there is shown an unintended operation control system 1 according to the first embodiment which is used as a safeguard system in automotive vehicles such as passenger automobiles to avoid unintended operations resulting in hazards or accidents on the vehicle. Specifically, the unintended operation control system 1 works to control unintended sudden acceleration of the vehicle arising from a driver's mistake in activating an accelerator, for example, depressing an accelerator pedal instead of a brake pedal.

The unintended operation control system 1 includes, as illustrated in FIG. 1(*a*), a system controller 10, an accelerator sensor 15, a radar 16, a shift position sensor 17, a vehicle speed sensor 18, and an unintended operation controller 20.

The accelerator sensor 15 is implemented by, for example, a typical accelerator position sensor, a typical accelerator pedal pressure sensor, or a typical throttle position sensor which measures a driver's effort on an accelerator pedal (not shown) of the vehicle as a function of a degree of acceleration required by the driver of the vehicle.

The radar 16 is implemented by, for example, a known millimeter-wave radar or a known laser radar which measures a position of an obstacle in a range (i.e., a frontward or a rearward range), as defined in a direction in which the vehicle travels, in the form of a distance to the obstacle and also measures the speed at which the vehicle is moving. The radar 16 outputs such measured values to the system controller 10.

The shift position sensor 17 measures the position of a shift lever (also called a selection lever) of a transmission mounted in the vehicle to determine a current operation mode of the vehicle such as a stop mode, a forward mode, or a reverse mode. The vehicle speed sensor 18 is of a known type which measures the speed of the vehicle to provide a signal indicative thereof to the system controller 10.

The unintended operation controller 20 is designed as a hazard-minimizing controller to control a drive power and/or a braking power for the vehicle, in other words, regulate the acceleration or the speed of the vehicle for minimizing hazards that the vehicle would experience. The unintended operation controller 20 is responsive to a travel control start signal from the system controller 10 to control the drive power (e.g., the output of an internal combustion engine mounted in the vehicle) to reduce the degree of acceleration of the vehicle, apply the braking power to wheels of the vehicle, and/or raise an alarm to urge the driver to stop the acceleration of the vehicle.

The system controller 10 is made by a typical microcomputer consisting of a CPU, a ROM, and a RAM. The CPU works to run programs stored in the ROM or programs loaded into the RAM to perform an operation analyzing task and a travel control task (i.e., a vehicle control task), which will be described later in detail.

The operation of the unintended operation control system 1 will be described below with reference to FIGS. 2(*a*) to 3(*c*).

FIGS. 2(*a*), 2(*b*), and 2(*c*) are graphs each of which demonstrates a time-series change in position of the accelerator pedal in an acceleration control mode when the driver depresses the accelerator pedal one time in a short period of time. The position of the accelerator pedal, as referred to therein, is a function of an amount by which the driver depresses the accelerator pedal (i.e., a driver's effort on the accelerator pedal) or an open position of a throttle valve.

FIGS. 3(*a*), 3(*b*), and 3(*c*) are graphs each of which demonstrates a time-series change in position of the accelerator pedal in the acceleration control mode when the driver depresses the accelerator pedal several times in a short period of time. Threshold vales 1 and 2 in FIGS. 2(*a*) to 3(*c*) are illustrated as being provided for an absolute value of the position of the accelerator pedal for the sake of simplicity of disclosure, but however, they are used actually in this embodiment for a rate of change in position of the accelerator pedal.

When the accelerator pedal has been depressed one time in a given short period of time, as illustrated in any of FIGS. 2(*a*) to 2(*c*), the system controller 10 enters the acceleration control mode. The threshold value 2 which is greater than the threshold value 1 is provided in order to permit a required degree of acceleration of the vehicle to be achieved. Specifically, when the position of the accelerator pedal exceeds the threshold value 2 in a pedal depressing pattern in any of FIGS. 2(*a*) to 2(*c*), the system controller 10 initiates the acceleration control mode.

When the accelerator pedal has been depressed a plurality of times in the given short period of time, as illustrated in any of FIGS. 3(*a*) to 3(*c*), the system controller 10 enters the acceleration control mode. It is found that when unintentionally pressing the accelerator pedal in error instead of the brake pedal, the driver of the vehicle tends to step on the accelerator pedal twice successively within a short period of time, while when pressing the accelerator pedal deliberately, the driver hardly ever depresses the accelerator pedal twice in quick succession. Therefore, when the driver has depressed the accelerator pedal twice within the given short period of time, the system controller 10 determines that an error has occurred in pressing the accelerator pedal and decreases the acceleration of the vehicle quickly.

There is no need to permit the degree of acceleration of the vehicle required by the driver to be achieved at the time when the accelerator pedal has been depressed twice in the short period of time. The threshold value 1 is, therefore, set smaller than the threshold value 2. When detecting the fact that the accelerator pedal has been depressed twice in the short period of time, the system controller 10 enters the acceleration control mode.

FIG. 1(*b*) illustrates a sequence of logical steps of an operation analyzing program to be executed by the system controller 10. The operation analyzing program is to analyze whether the vehicle is in the condition or not where the driver is likely to press the accelerator pedal accidently instead of the brake pedal or where the vehicle would be subject to danger due to an error in pressing the accelerator pedal to determine whether the acceleration control mode should be entered or not. This program is initiated at the time when the vehicle is powered on and executed in a cycle equal to or shorter than a cycle in which the travel control task, as will be described later in detail, is run.

After entering the operation analyzing program of FIG. 1(*b*), the routine proceeds to step S10 wherein vehicle information is acquired. The vehicle information, as referred to in this embodiment, is information about the vehicle equipped with the unintended operation control system 1 which is represented by parameters, as measured by the sensors 15 to 18 and the radar 16, and data derived from other devices.

The routine proceeds to step S20 wherein it is determined whether it is determined whether an obstacle exists ahead of the vehicle or not.

If a YES answer is obtained in step S20, then the routine proceeds to step S30 wherein it is determined whether the shift lever is in a mode other than a parking (P) mode or a neutral (N) mode or not. If a YES answer is obtained meaning that the shift lever is in a drive (D) mode or a reverse (R) mode, then the routine proceeds to step S40 wherein it is determined whether the speed of the vehicle, as measured by the vehicle speed sensor 18, is greater than or equal to a given reference value or not.

Specifically, the operation in step S20 is made using outputs from the radar 16 and the shift position sensor 17 to detect a pedestrian, another vehicle, or an obstacle (including an area such as a cliff where it is impossible for the vehicle to run safely). The operation in step S30 to determine whether the shift lever is in the mode other than the parking or neutral mode or not is made to determine whether the vehicle is in a condition where the power is enabled to be transmitted to the wheels of the vehicle or not using the output from the shift position sensor 17. The operation in step S40 is made to determine whether the output from the vehicle speed sensor 18 indicates, for example, less than 30 km/h at which there is a high probability that the driver depresses the accelerator pedal in error instead of the brake pedal. The reference value used in step S30 is, therefore, set to 30 km/h or more.

If the obstacle exists in the direction in which the vehicle is running (i.e., YES in step S20), the shift lever is in the mode other than the parking or the neutral mode (i.e., YES in step S30), and the speed of the vehicle is less than or equal to the reference value (i.e., YES in step S40, then the routine proceeds to step S50 wherein the travel control task is enabled, as will be described later in detail. Alternatively, if no obstacle exists in the direction in which the vehicle is running (i.e., NO in step S20), the shift lever is in the parking or neutral mode (i.e., NO in step S30), and the speed of the vehicle is greater than the reference value (i.e., NO in step S40, then the routine proceeds to step S60 wherein the travel control task is inhibited, as will be described later in detail. When the travel control task is inhibited, the system controller 10 does not control the acceleration of the vehicle. After step S50 or S60, the routine terminates.

FIG. 4 is a flowchart of the travel control task to be executed by the system controller 10. The travel control task is to monitor whether the driver of the vehicle has unintentionally activated the accelerator pedal or the brake pedal, that is in this embodiment, whether an error has arisen in depressing the accelerator pedal in place of the brake pedal or not and, if such a condition is encountered, to control the degree of acceleration of the vehicle. When this program is performed for the first time, a counter value or a flag, as will be described later, are reset to zero.

The travel control task is commenced when the travel control task is enabled in step S50 of FIG. 1(*b*) and executed at a regular interval of, for example, 16 ms. until the travel control task is inhibited in step S60.

First, in step S110, a result of a deceleration decision made in a depression error decision mode of the system controller 10 is analyzed to determine whether it is decided that the vehicle has being decelerated rapidly or not using a rapid deceleration flag. When the fact that an opening angle of the throttle valve of the vehicle (i.e., the degree to which the throttle valve is opened, in other words, the degree to which the accelerator pedal is depressed, which will also be referred to as a throttle opening angle or an accelerator pedal angle below) that is a function of the position of the accelerator pedal, as measured by the accelerator sensor 15, has been decreased rapidly at least once in a given period of time is found, the rapid deceleration flag is set to one (1). Alternatively, when the accelerator pedal angle is determined not to have being decreased in the given period of time, the rapid deceleration flag is set to zero (0). If a YES answer is obtained in step S110 meaning that the rapid deceleration flag is one, that is, that the vehicle is determined to have being decelerated rapidly, then the routine proceeds to step S120 wherein the value of the counter is incremented by one. The routine proceeds to step S130 wherein a pedal angle increase threshold value is calculated.

Figure 5A:
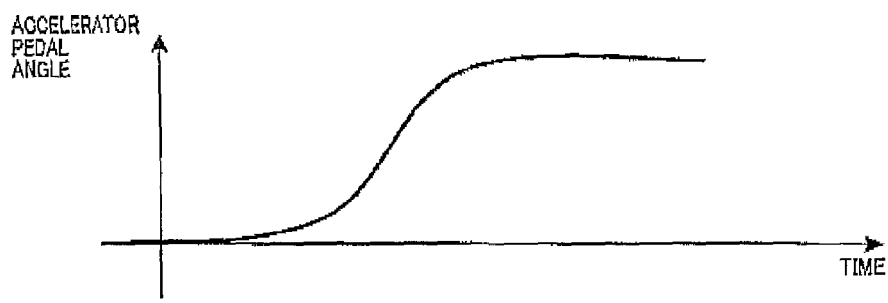
FIGS. 5(a), 5(b), and 5(c) are graphs which demonstrate a change in accelerator pedal angle, a rate of change in accelerator pedal angle, and a relation between the accelerator pedal angle and the rate of change in accelerator pedal angle for use in determining a pedal angle increase threshold value.
Figure 5B:
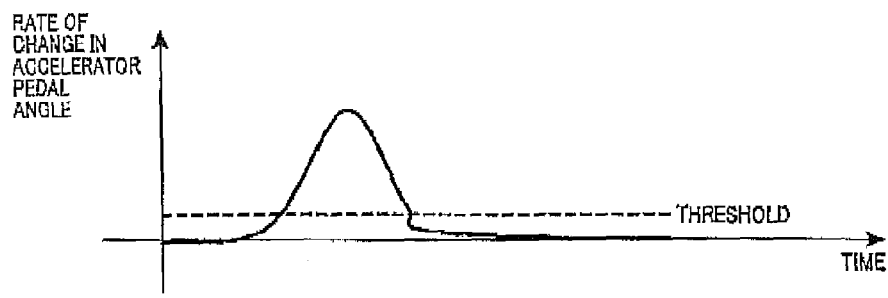
Figure 5C:
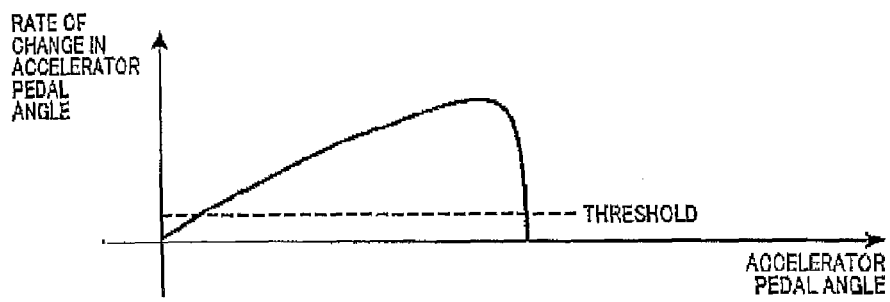

The calculation of the pedal angle increase threshold value is described below with reference to FIGS. 5(*a*) to 5(*c*) which represent a change in accelerator pedal angle (i.e., throttle opening angle), a rate of change in accelerator pedal angle, and a relation between the accelerator pedal angle and the rate of change in accelerator pedal angle. When the accelerator pedal angle that is a function of the position of the accelerator pedal increases, as demonstrated in FIG. 5(*a*), with time, the rate of change in accelerator pedal angle, as illustrated in FIG. 5(*b*), increases from zero and then decreases to zero again. The relation between the accelerator pedal angle and the rate of change in accelerator pedal angle is expressed by a curve, as illustrated in FIG. 5(*c*).

The pedal angle increase threshold value is calculated to a value corresponding to 10%/second in the rate of change in accelerator pedal angle. The use of such a pedal angle increase threshold value enables the fact that the accelerator pedal angle has been decreased and then increased to be found regardless of the absolute value of the accelerator pedal angle. The pedal angle increase threshold value may alternatively be determined for the absolute value of the accelerator pedal angle or a combination of the absolute value of the accelerator pedal angle and the rate of change in accelerator pedal angle.

After step S130, the routine proceeds to step S140 wherein it is determined whether the value of the counter is greater than or equal to a given value or not. This determination is made to determine whether it is now within an increase decision time zone or not. The increase decision time zone is a time zone in which the system controller 10 is to determine whether the accelerator pedal angle has started to increase just after being decreased. If a YES answer is obtained in step S140 meaning that the value of the counter is greater than or equal to the given value, the system controller 10 determines that an adequate time has passed after the accelerator pedal angle has started to be decreased, that is, that it is out of the increase decision time zone. The routine proceeds to step S210 wherein the rapid deceleration flag is set to zero. The routine then proceeds to step S220 which will be described later in detail.

Alternatively, if a NO answer is obtained in step S140 meaning that the value of the counter is less than the given value, then the routine proceeds to step S150 wherein it is determined whether the rate of change in accelerator pedal angle is positive in sign, that is, whether the accelerator pedal angle is being increased or not. If a NO answer is obtained meaning that the rate of change in accelerator pedal angle is negative in sign, then the routine terminates. Alternatively, if a YES answer is obtained, then the routine proceeds to step S160 wherein it is determined whether the rate of change in accelerator pedal angle is greater than the pedal angle increase threshold value (i.e., the threshold 1 in FIGS. 3(*a*) to 3(*c*)) or not. If a YES answer is obtained meaning that the rate of change in accelerator pedal angle is greater than the pedal angle increase threshold value, then the routine proceeds to step S170 wherein the rapid deceleration flag is reset to zero. The system controller 10 then decides that the driver of the vehicle has depressed the acceleration pedal in error instead of the brake pedal. The routine proceeds to step S290 wherein the system controller 10 outputs the travel control start signal to the unintended operation controller 20. The unintended operation controller 20 then starts to perform the travel suppression control to decrease the drive power (e.g., the engine output power) and/or increase the braking power for the vehicle. The routine then terminates. Alternatively, if a NO answer is obtained in step S160 meaning that the rate of change in accelerator pedal angle is less than the pedal angle increase threshold value, then the routine terminates.

If it is determined in step S110 that the system controller 10 in the depression error decision mode is not deciding that the vehicle has been decelerated rapidly, that is, that the rapid deceleration flag is zero, then the routine proceeds to step S220 wherein it is determined whether the rate of change in accelerator pedal angle is negative in sign or not. If a NO answer is obtained meaning that the rate of change in accelerator pedal angle is not negative in sign, the routine then terminates. Alternatively, if a YES answer is obtained, then the routine proceeds to step S230 wherein a rapid pedal angle decrease threshold value is calculated.

Figure 6A:
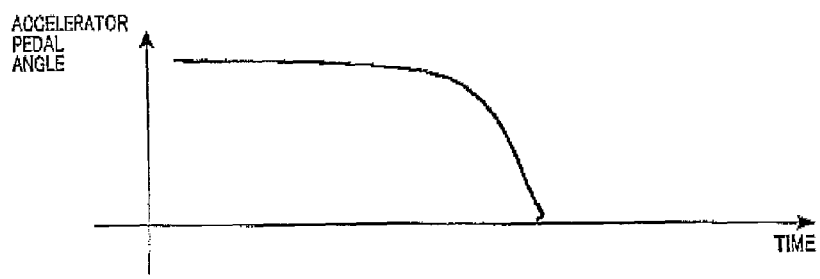
FIGS. 6(a), 6(b), and 6(c) are graphs which demonstrate a change in accelerator pedal angle, a rate of change in accelerator pedal angle, and a relation between the accelerator pedal angle and the rate of change in accelerator pedal angle for use in determining a pedal angle decrease threshold value.
Figure 6B:
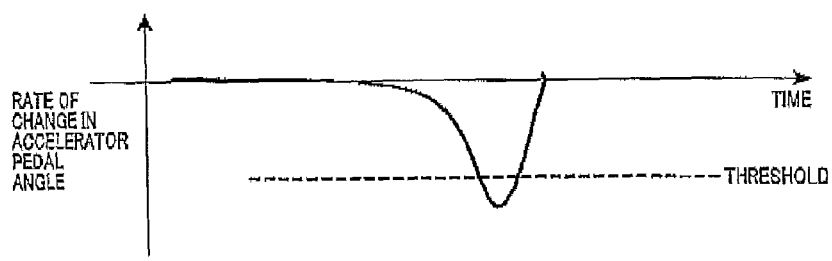
Figure 6C:
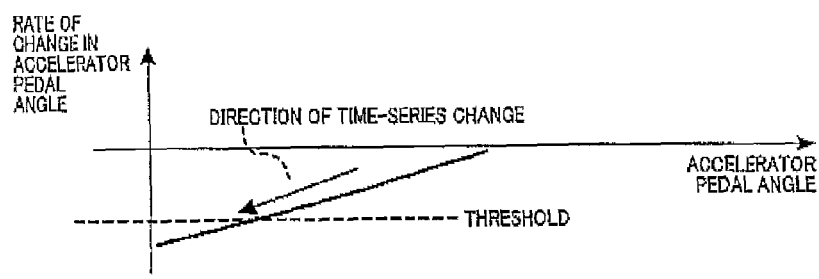

The calculation of the rapid pedal angle decrease threshold value is described below with reference to FIGS. 6(a) to 6(c) which represent a change in accelerator pedal angle, a rate of change in accelerator pedal angle, and a relation between the accelerator pedal angle and the rate of change in accelerator pedal angle. When the accelerator pedal angle decreases, as demonstrated in FIG. 6(a), with time, the rate of change in accelerator pedal angle, as illustrated in FIG. 5(b), drops from zero and then rises to zero again. The relation between the accelerator pedal angle and the rate of change in accelerator pedal angle is expressed by a line, as illustrated in FIG. 6(c).

The rapid pedal angle decrease threshold value is calculated to a value corresponding to −10%/second in the rate of change in accelerator pedal angle. The use of such a pedal angle decrease threshold value enables the fact that the accelerator pedal angle has been decreased to be found regardless of the value of the accelerator pedal angle itself. The rapid pedal angle decrease threshold value may alternatively be determined for the absolute value of the accelerator pedal angle or amount by which the accelerator pedal angle decreases or a combination of it with the rate of change in accelerator pedal angle.

After step S230, the routine proceeds to step S240 wherein it is determined whether the rate of change in accelerator pedal angle is smaller than the rapid pedal angle decrease threshold value or not. If a YES answer is obtained meaning that the rate of change in accelerator pedal angle is greater than the rapid pedal angle decrease threshold value, then the routine proceeds to step S250 wherein the rapid deceleration flag is set to one. The routine proceeds to step S260 wherein the value of the counter is reset to zero. The routine then terminates.

Alternatively, if a NO answer is obtained in step S240 meaning that the rate of change in accelerator pedal angle is greater than or equal to the rapid pedal angle decrease threshold value, then the routine terminates.

As apparent from the above discussion, the system controller 10 of the unintended operation control system 1 works to cyclically acquire and analyze information about the degree to which the accelerator pedal is activated (which will also be referred to as an accelerator-manipulated variable or a pedal effort). When it is found that the pedal effort has dropped by a drop threshold (i.e., the rapid pedal angle decrease threshold value) or more within a given drop decision time period, after which it has risen within a given rise decision time period, the system controller 10 decides that the accelerator pedal has been activated accidently and then suppresses the acceleration of the vehicle or inhibits the vehicle from accelerating.

Figure 7:
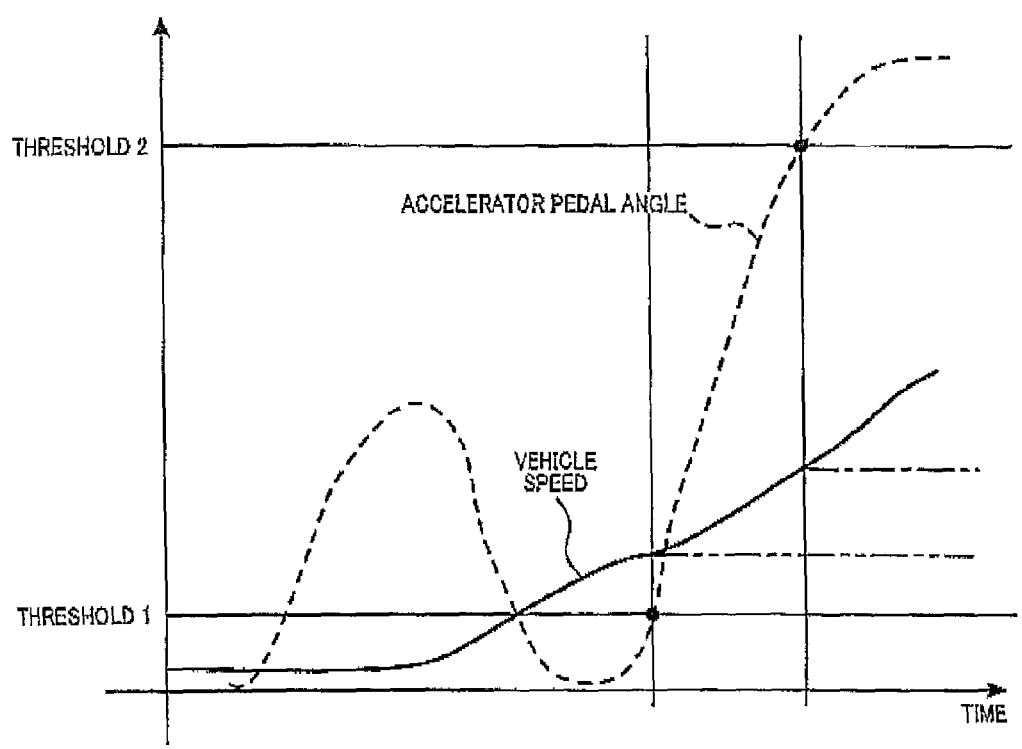
FIG. 7 is a graph which demonstrates time-series changes in accelerator pedal angle and speed of a vehicle.

In other words, when the pedal effort starts to increase after it has been decreased, the unintended operation control system 1 controls the acceleration of the vehicle before the speed of the vehicle becomes high undesirably. Specifically, as shown in FIG. 7 demonstrating a time-series change in accelerator pedal angle, when the conventional system starts to control the acceleration of the vehicle after the accelerator pedal angle becomes undesirably great (see threshold 2 in FIG. 7), so that the speed of the vehicle is lowered at a rate, as indicated by a broken line. The unintended operation control system 1 starts to control the acceleration of the vehicle before the accelerator pedal angle becomes undesirably great (see threshold 1 in FIG. 7), so that the speed of the vehicle is decreased at a rate, as indicated by a solid line, lower than that indicated by the broken line.

When it is found that the pedal effort has dropped by a drop threshold (i.e., the rapid pedal angle decrease threshold value) within a given drop decision time period, after which it has risen by a rise threshold (i.e., the pedal angle increase threshold value) within the given rise decision time period, the system controller 10, as described above, decides that the accelerator pedal has been activated accidently. In other words, when the pedal effort has changed slightly, so that it is below the rise threshold, the unintended operation control system 1 decides that the accelerator pedal has not been activated unintentionally, thereby avoiding an error in suppressing the acceleration of the vehicle.

The unintended operation control system 1 also works to monitor some obstacle in the direction in which the vehicle is running. When the obstacle is not detected, the system controller 10 inhibits the travel control task from being performed to suppress the acceleration of the vehicle, thereby avoiding an error in suppressing the acceleration of the vehicle.

The system controller 10 of the unintended operation control system 1 also works to determine whether the vehicle is in the condition where the power is enabled to be transmitted to the wheels of the vehicle or not. When such a condition is not encountered, that is, the vehicle is not in a condition where the wheels are enabled to be accelerated, the system controller 10 inhibits the travel control task from being performed to suppress the acceleration of the vehicle, thereby avoiding undesired control action to suppress the acceleration of the vehicle.

The system controller 10 also works to determine whether the speed of the vehicle is greater than or equal to the given reference value or not. When such a condition is encountered, the system controller 10 inhibits the travel control task from being performed to suppress the acceleration of the vehicle. Usually, when the vehicle is running at a relatively high speed, there is a low probability that the driver activates the accelerator pedal accidently. When such a probability is met, the system controller 10 does not control the acceleration of the vehicle in the depression error decision mode.

Figure 8:
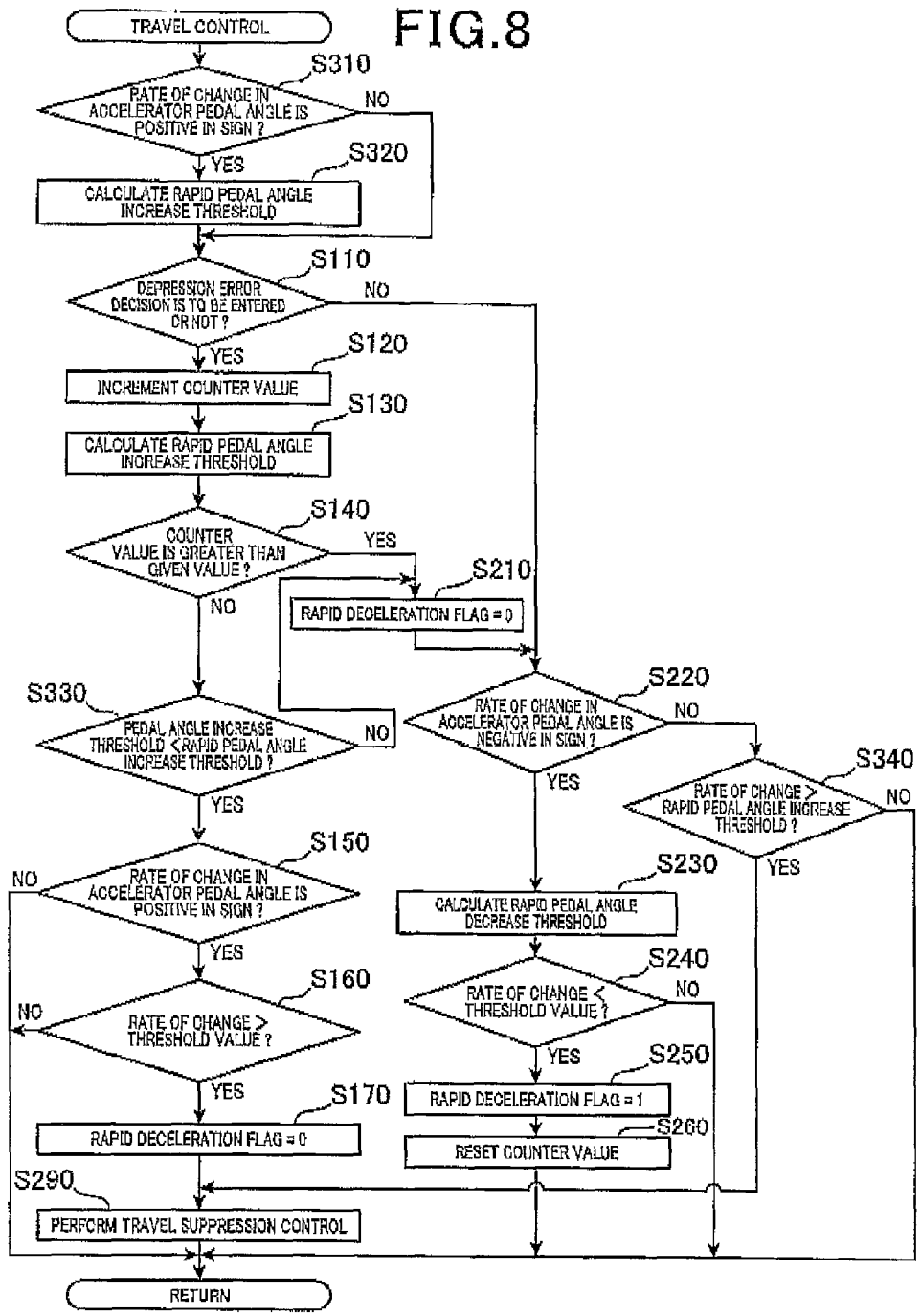
FIG. 8 is a flowchart of a travel control task to be executed by an unintended operation control system of the second embodiment.

The unintended operation control system 1 of the second embodiment will be described below. The unintended operation control system 1 of this embodiment has the same structure, as illustrated in FIG. 1(a), but is engineered to perform a travel control task, as shown in FIG. 8. The same step numbers, as employed in FIG. 4, refer to the same operations, and explanation thereof in detail will be omitted here. The travel control task of FIG. 8 is, like in FIG. 4, commenced when the travel control task is enabled in step S50 of FIG. 1(b) and executed at a regular interval of, for example, 16 ms until the travel control task is inhibited in step S60.

After entering the program, the routine proceeds to step S310 wherein it is determined whether the rate of change in accelerator pedal angle is positive in sign or not. if a NO answer is obtained meaning that the rate of change in accelerator pedal angle is negative in sign, then the routine proceeds to step S110. Alternatively, if a YES answer is obtained, then the routine proceeds to step S320 wherein a rapid pedal angle increase threshold value is calculated.

Figure 9A:
FIGS. 9(a), 9(b), and 9(c) are graphs which demonstrate a change in accelerator pedal angle, a rate of change in accelerator pedal angle, and a relation between the accelerator pedal angle and the rate of change in accelerator pedal angle for use in determining a rapid pedal angle increase threshold value.
Figure 9B:
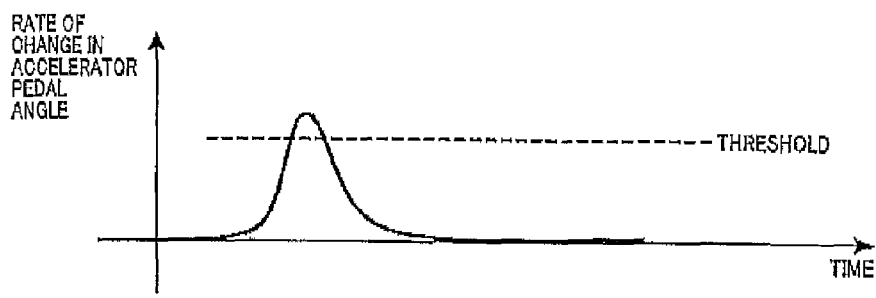
Figure 9C:
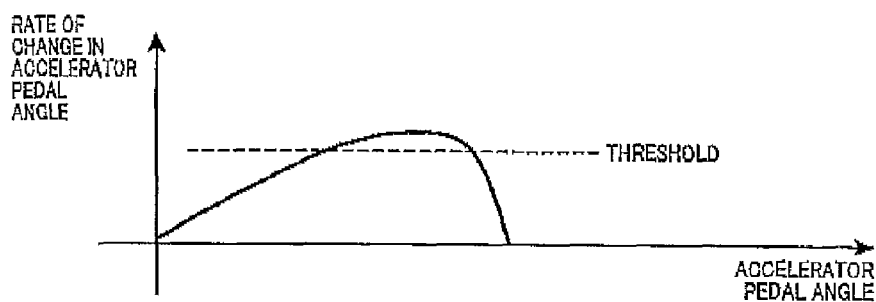

The calculation of the rapid pedal angle increase threshold value is described below with reference to FIGS. 9(a) to 9(c) which represent a change in accelerator pedal angle, a rate of change in accelerator pedal angle, and a relation between the accelerator pedal angle and the rate of change in accelerator pedal angle. When the accelerator pedal angle that is a function of the position of the accelerator pedal increases, as demonstrated in FIG. 9(a), with tine, the rate of change in accelerator pedal angle, as illustrated in FIG. 9(b), increases from zero and then decreases to zero again. The relation between the accelerator pedal angle and the rate of change in accelerator pedal angle is expressed by a curve, as illustrated in FIG. 9(c).

The rapid pedal angle increase threshold value is set equivalent to 25%/sec. in the rate of change in accelerator pedal angle which is greater than the pedal angle increase threshold value calculated in step S130 of FIG. 4. The use of such a rapid pedal angle increase threshold value enables the fact that the accelerator pedal angle has been increased rapidly to be found regardless of the value of the accelerator pedal angle itself. The rapid pedal angle increase threshold value may alternatively be determined for the absolute value of the accelerator pedal angle or a combination of the absolute value of the accelerator pedal angle and the rate of change in accelerator pedal angle.

After the rapid pedal angle increase threshold value is determined in step S320, the routine proceeds to step S110 wherein it is decided that the vehicle has being decelerated rapidly or not using the rapid deceleration flag. If a YES answer is obtained in step S110 meaning that the rapid deceleration flag is one, then the routine proceeds to step S120 wherein the value of the counter is incremented by one. The routine proceeds to step S130 wherein the pedal angle increase threshold value is calculated.

The routine then proceeds to step S140 wherein it is determined whether the value of the counter is greater than or equal to the given value. If a YES answer is obtained, the routine proceeds to step S210 wherein the rapid deceleration flag is set to zero.

Alternatively, if a NO answer is obtained in step S140, then the routine proceeds to step S330 wherein it is determined whether the pedal angle increase threshold value is smaller than the rapid pedal angle increase threshold value or not. In this embodiment, the pedal angle increase threshold value and the rapid pedal angle increase threshold value are, as described above, selected as fixed values, respectively. The pedal angle increase threshold value is set smaller than the rapid pedal angle increase threshold value. However, they may be set variable, like in the third embodiment, as will be described later in detail. The determination in step S330 is, therefore, made in this program.

If a YES answer is obtained in step S330 meaning that the pedal angle increase threshold value is smaller than the rapid pedal angle increase threshold value, then the routine proceeds to step S150. Alternatively, if a NO answer is obtained, then the routine proceeds to step S210.

If a NO answer is obtained in step S110 or after step S210, the routine proceeds to step S220 wherein it is determined whether the rate of change in accelerator pedal angle is negative in sign or not. If a NO answer is obtained meaning that the rate of change in accelerator pedal angle is not negative in sign, then the routine proceeds to step S340 wherein it is determined whether the rate of change in accelerator pedal angle is greater than the rapid pedal angle increase threshold value (i.e., the threshold 2 in FIGS. 3(a) to 3(c)) or not. If a YES answer is obtained meaning that the rate of change in accelerator pedal angle is greater than the rapid pedal angle increase threshold value, then the routine proceeds to step S290 wherein the travel suppression control is performed to decrease the drive power (e.g., the engine output power) and/or increase the braking power for the vehicle. Alternatively, if a NO answer is obtained, then the routine terminates. Other operations are identical with those in FIG. 4, and explanation thereof in detail will be omitted here.

As apparent from the above discussion, the system controller 10 of this embodiment also works to analyze the pedal effort to determine whether it becomes greater than or equal to an acceleration threshold value (i.e., the rapid pedal angle increase threshold value) which is selected to be greater than the rise threshold (i.e., the pedal angle increase threshold value) or not and, when such a condition is encountered, decides that the driver has activated the accelerator pedal unintentionally instead of the brake pedal.

Specifically, the unintended operation control system 1 of this embodiment is engineered to control the unintended acceleration of the vehicle effectively even when it is not found that the pedal effort drops.

The unintended operation control system 1 of the third embodiment will be described below. The unintended operation control system 1 of this embodiment has the same structure, as illustrated in FIG. 1(a), but is engineered to perform a travel control task, as shown in FIG. 10. The same step numbers, as employed in FIG. 4, refer to the same operations, and explanation thereof in detail will be omitted here. The travel control task of FIG. 10 is, like in FIG. 4, commenced when the travel control task is enabled in step S50 of FIG. 1(b) and executed at a regular interval of, for example, 16 ms until the travel control task is inhibited in step S60.

The pedal angle increase threshold value, as used in this program, is not fixed, but set variable. Specifically, the pedal angle increase threshold value is determined as a function of a minimum value (i.e., a lower limit peak value) of the rate of change in accelerator pedal angle.

More specifically, instead of step S170 or S210 of FIG. 8 wherein the rapid deceleration flag is reset to zero, step S410 or S420 is performed to reset both the rapid deceleration flag and the lower limit peak value to zero. Additionally, if a YES answer is obtained in step S220 meaning that the rate of change in accelerator pedal angle is negative in sign, then the routine proceeds to step S440 wherein the lower limit peak value of the rate of change in accelerator pedal angle is store in the system controller 10. The routine then proceeds to step S450 wherein it is determined whether the accelerator pedal angle is lower than a lower limit set value or not which is used for determining whether the driver of the vehicle is releasing the accelerator pedal or not.

If a YES answer is obtained in step S450 meaning that the accelerator pedal angle is less than the lower limit set value, then the routine proceeds to step S250 wherein the rapid deceleration flag is set to one. Alternatively, if a NO answer is obtained, then the routine terminates.

If a NO answer is obtained in step S220 meaning that the rate of change in accelerator pedal angle is not negative in sign, then the routine proceeds to step S460 wherein the lower limit peak value is reset to zero. The routine proceeds to step S340 wherein it is determined whether the rate of change in accelerator pedal angle is greater than the rapid pedal angle increase threshold value or not. If a YES answer is obtained meaning that the rate of change in accelerator pedal angle is greater than the rapid pedal angle increase threshold value, then the routine proceeds to step S290 wherein the travel suppression control is performed to decrease the drive power (e.g., the engine output power) and/or increase the braking power for the vehicle. Alternatively, if a NO answer is obtained, then the routine terminates.

Figure 11A:
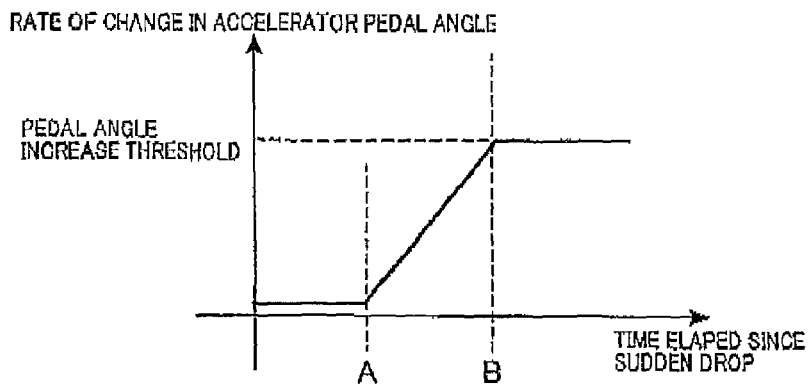
FIGS. 11(a), 11(b), and 11(c) are graphs which illustrate modified manners to determine a pedal angle increase threshold value variably.
Figure 11B:
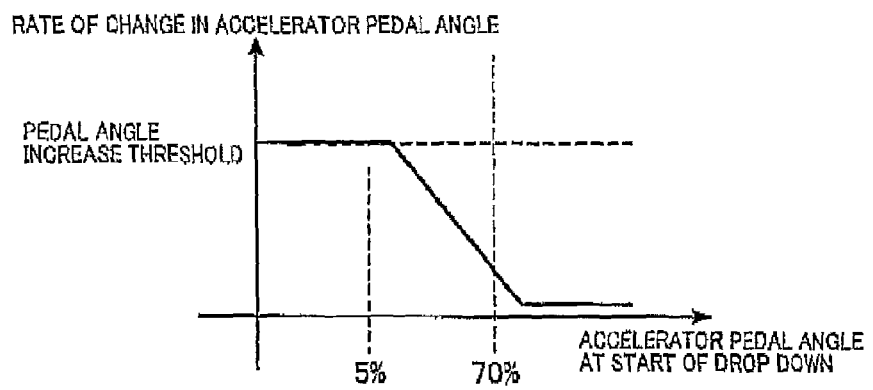
Figure 11C:
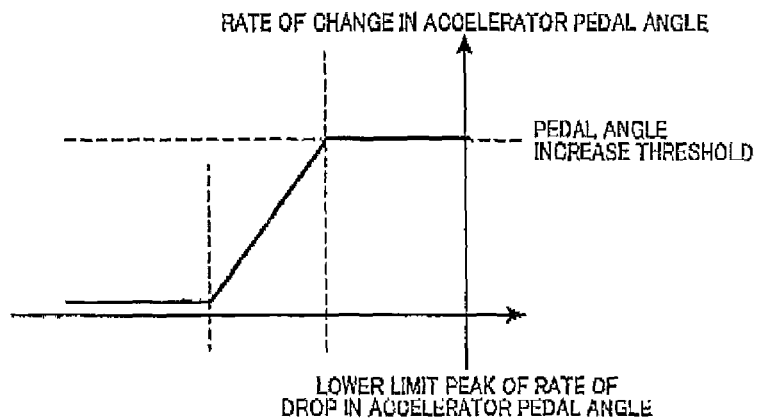

The calculation of the pedal angle increase threshold value is described below with reference to FIG. 11(c) which represents a relation of the pedal angle increase threshold value to the lower limit peak value of the rate of change in accelerator pedal angle. Specifically, the pedal angle increase threshold value is, as can be seen from FIG. 11(c), determined to be smaller as the lower limit peak value decreases, thereby causing the system controller 10 to be responsive to a smaller increase in accelerator pedal angle to determine that the driver has depressed the accelerator pedal accidently.

In other words, the system controller 10 selects the pedal angle increase threshold value to be smaller as the velocity or rate at which the pedal effort drops by the drop threshold or more increases.

As apparent from the above discussion, the unintended operation control system 1 of the third embodiment is designed to monitor a degree of impatience (i.e., the state of mind) of the driver in terms of the rate of drop of the pedal effort and accelerate the execution of the travel control as the degree of impatience increases, that is, the rate of drop of the pedal effort becomes high.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The unintended operation control system 1, as described above, does not to execute the suppression of acceleration of the vehicle once the travel control task is inhibited from being performed, but may alternatively be engineered to permit the travel control task to be executed unconditionally. This eliminates the need for executing the operation analyzing program of FIG. 1(*b*).

The calculation of the pedal angle increase threshold value in step S130 may be achieved in the following manner. The pedal angle increase threshold value is increased as the time elapsed since the pedal effort drops by the drop threshold or more in the given rise decision time period becomes long. Specifically, the pedal angle increase threshold value is increased, as illustrated in FIG. 11(*a*), with an increase in the elapsed time. "A" indicates the length of time (e.g., 0.2 sec.) consumed by the driver to change the depression between the accelerator pedal and the brake pedal quickly. "B" indicates an average length of time (e.g., 0.5 sec.) the driver typically takes to change the depression between the accelerator pedal and the brake pedal in an unhurried way. Such lengths of time are preferably determined experimentally.

The unintended operation control system 1, as modified above, works to achieve quick detection of a driver's error in depressing the acceleration pedal instead of the brake pedal after the pedal effort drops without increasing the probability of an error in detecting such a driver's error.

The pedal angle increase threshold value may also be decreased in step S130, as illustrated in FIG. 11(*b*), with an increase in value (%) of the accelerator pedal angle at the time when the accelerator pedal angle starts to drop.

The determination of the pedal angle increase threshold value may be made in any one or a combination of two or all of the manners, as illustrated in FIGS. 11(*a*), 11(*b*), and 11(*c*). For instance, the pedal angle increase threshold value may be calculated in one of the manners of FIGS. 11(*a*) to 11(*c*) and then corrected in the other manner(s).

Figure 12A:
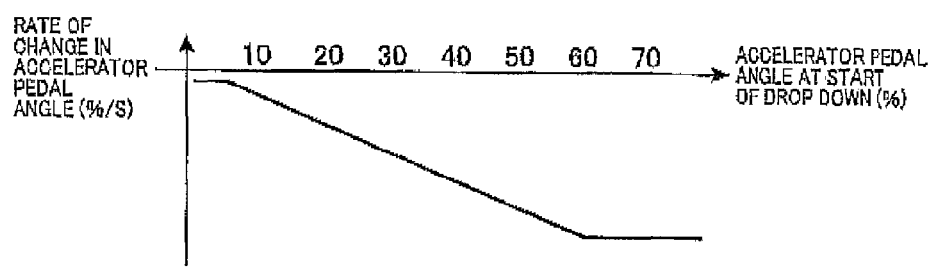
FIGS. 12(a) and 12(b) are graphs which illustrate a modified manner to determine a rapid pedal angle decrease threshold value variably.
Figure 12B:
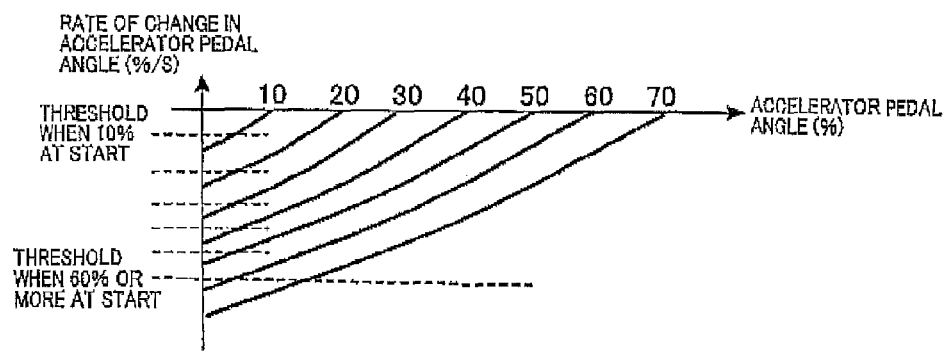

The rapid pedal angle decrease threshold value is selected to be a fixed value in step S230, but may be determined to be variable. For instance, the rapid pedal angle decrease threshold value may be decreased, as illustrated in FIGS. 12(*a*) and 12(*b*), with an increase in value (%) of the accelerator pedal angle at the time when the accelerator pedal angle starts to drop. This enables the system controller 10 not to determine that the accelerator pedal angle has dropped unless when the value of the accelerator pedal angle at the time when it starts to drop is greater, the accelerator pedal angle drops by a greater amount. This results in a decrease in probability of an error in detecting the driver's error in depressing the acceleration pedal instead of the brake pedal.

The rapid pedal angle increase threshold value is set to a fixed value in step S320, but may be determined to be variable. Usually, the probability of hazards posed by the driver's error in depressing the accelerator pedal unintentionally will be higher with an increase in value of the accelerator pedal angle at the time when a rapid rise in accelerator pedal angle starts to be detected. The rapid pedal angle increase threshold value may, thus, be decreased, as illustrated in FIGS. 13(*a*) and 13(*b*).

Figure 13A:
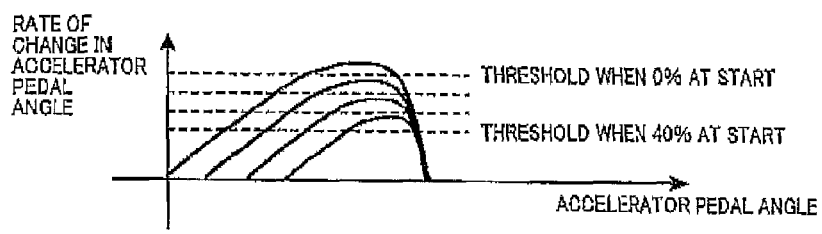
FIGS. 13(a), 13(b), and 13(c) are graphs which illustrate modified manners to determine a rapid pedal angle increase threshold value variably.
Figure 13B:
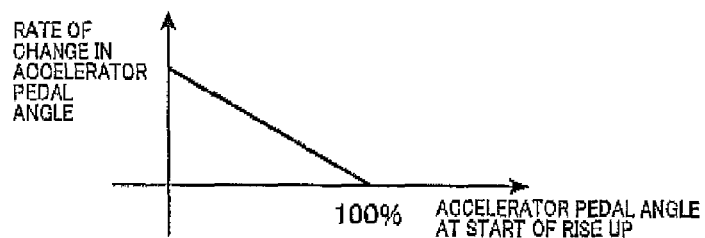
Figure 13C:
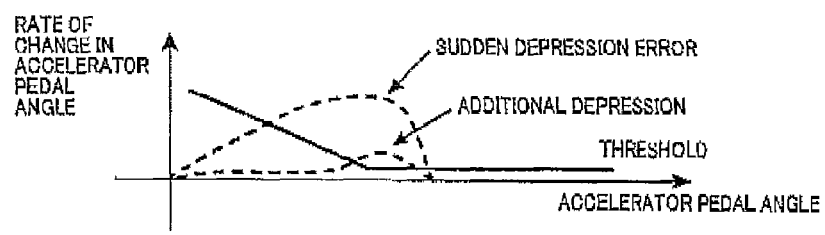

When the obstacle has been detected by the radar 16, the rapid pedal angle increase threshold value may be selected, as illustrated in FIG. 13(*c*), as functions of an absolute value of the accelerator pedal angle and the rate of change in accelerator pedal angle so that the rapid pedal angle increase threshold value will be smaller than when no obstacles are detected in order to achieve quick execution of the suppression of acceleration of the vehicle.

Each of the threshold values may be determined in a combination of the manner, as described above. Additionally, each of the threshold values may be provided in relation to the absolute value of the accelerator pedal angle, the rate of change in accelerator pedal angle, or a combination thereof.

What is claimed is:

1. A safeguard system for a vehicle comprising:
an accelerator-manipulated variable calculator which calculates an accelerator-manipulated variable representing a degree to which an accelerator of the vehicle is manipulated; and
a hazard-minimizing controller which works to control an operation of the vehicle so as to minimize a probability of encountering a hazard to the vehicle when it is found that the accelerator-manipulated variable, as calculated by the accelerator-manipulated variable calculator, has dropped at a given rate and then risen within a preselected rise time period; wherein
when the accelerator-manipulated variable has dropped by a drop threshold or more within a preselected drop time period and then exceeded a rise threshold within the rise time period, the hazard-minimizing controller works to minimize the probability of encountering the hazard to the vehicle; and
the hazard-minimizing controller decreases the rise threshold with an increase in rate at which the accelerator-manipulated variable has dropped by the drop threshold or more.

2. A safeguard system for a vehicle comprising:
an accelerator-manipulated variable calculator which calculates an accelerator-manipulated variable representing a degree to which an accelerator of the vehicle is manipulated; and
a hazard-minimizing controller which works to control an operation of the vehicle so as to minimize a probability of encountering a hazard to the vehicle when it is found that the accelerator-manipulated variable, as calculated by the accelerator-manipulated variable calculator, has dropped at a given rate and then risen within a preselected rise time period; wherein
when the accelerator-manipulated variable has dropped by a drop threshold or more within a preselected drop time period and then exceeded a rise threshold within the rise time period, the hazard-minimizing controller works to minimize the probability of encountering the hazard to the vehicle; and the hazard-minimizing controller decreases the rise threshold with an increase in value of the accelerator-manipulated variable at a time when the accelerator-manipulated variable starts to drop.

3. A safeguard system for a vehicle comprising:

an accelerator-manipulated variable calculator which calculates an accelerator-manipulated variable representing a degree to which an accelerator of the vehicle is manipulated; and a hazard-minimizing controller which works to control an operation of the vehicle so as to minimize a probability of encountering a hazard to the vehicle when it is found that the accelerator-manipulated variable, as calculated by the accelerator-manipulated variable calculator, has dropped at a given rate and then risen within a preselected rise time period; wherein when the accelerator-manipulated variable has dropped by a drop threshold or more within a preselected drop time period and then exceeded a rise threshold within the rise time period, the hazard-minimizing controller works to minimize the probability of encountering the hazard to the vehicle; and the hazard-minimizing controller decreases the rise threshold with a decrease in minimum value of a rate of change in the accelerator-manipulated variable when the accelerator-manipulated variable has dropped.

4. A safeguard system for a vehicle comprising:

an accelerator-manipulated variable calculator which calculates an accelerator-manipulated variable representing a degree to which an accelerator of the vehicle is manipulated; and a hazard-minimizing controller which works to control an operation of the vehicle so as to minimize a probability of encountering a hazard to the vehicle when it is found that the accelerator-manipulated variable, as calculated by the accelerator-manipulated variable calculator, has dropped at a given rate and then risen within a preselected rise time period; wherein when the accelerator-manipulated variable has dropped by a drop threshold or more within a preselected drop time period and then exceeded a rise threshold within the rise time period, the hazard-minimizing controller works to minimize the probability of encountering the hazard to the vehicle; and the hazard-minimizing controller decreases the drop threshold with a decrease in value of the accelerator-manipulated variable at a time when the accelerator-manipulated variable starts to drop.

5. A safeguard system as set forth in claim 1, wherein when the accelerator-manipulated variable has increased to be greater than a given acceleration threshold value, the hazard-minimizing controller serves to control the operation of the vehicle so as to minimize the probability of encountering the hazard to the vehicle.

6. A safeguard system as set forth in claim 5, wherein the rise threshold is selected to be smaller than the acceleration threshold value.

7. A safeguard system as set forth in claim 1, further comprising an obstacle detector which detects an obstacle in a direction in which the vehicle is traveling, and wherein the hazard-minimizing controller controls the operation of the vehicle so as to minimize the probability of encountering the hazard to the vehicle only when the obstacle has been detected by the obstacle detector.

8. A safeguard system as set forth in claim 1, wherein the hazard-minimizing controller determines whether the vehicle is in a travel-enabled condition where the vehicle is enabled to run or not, and wherein when the vehicle is determined not to be in the travel-enabled condition, the hazard-minimizing controller is inhibited from controlling the operation of the vehicle so as to minimize the probability of encountering the hazard to the vehicle.

9. A safeguard system as set forth in claim 1, wherein the hazard-minimizing controller determines whether a speed of the vehicle is greater than or equal to a reference value or not, and wherein when the speed of the vehicle is determined to be greater than the reference value, the hazard-minimizing controller is inhibited from controlling the operation of the vehicle so as to minimize the probability of encountering the hazard to the vehicle.

10. A safeguard system as set forth in claim 1, wherein the hazard-minimizing controller works to suppress acceleration of the vehicle to minimize the probability of encountering the hazard to the vehicle.

11. A safeguard system as set forth in claim 1, wherein the hazard-minimizing controller works to suppress speed of the vehicle to minimize the probability of encountering the hazard to the vehicle.

12. A safeguard system as set forth in claim 1, wherein the hazard-minimizing controller also works to raise an alarm to urge a driver of the vehicle to minimize the probability of encountering the hazard to the vehicle.

* * * * *